United States Patent [19]

Schneeberger

[11] Patent Number: 4,900,294
[45] Date of Patent: Feb. 13, 1990

[54] GARAGE DOOR OPENER DRIVE MECHANISM

[76] Inventor: Erich Gottfried Schneeberger, Dorfrebenstrasse No. 32, CH-8165 Schoefflisdorf, Switzerland

[21] Appl. No.: 336,234

[22] Filed: Apr. 11, 1989

[51] Int. Cl.$^4$ ............................................. F16H 55/32
[52] U.S. Cl. ...................................... 474/167; 474/174
[58] Field of Search ................................ 474/166–168, 474/174, 176, 184, 188, 189, 903

[56] References Cited

U.S. PATENT DOCUMENTS

| | | | |
|---|---|---|---|
| 2,060,322 | 11/1936 | Johnson | 474/167 |
| 2,471,969 | 5/1949 | Meyer | 474/174 X |
| 4,364,736 | 12/1982 | Hetz | 474/168 |

Primary Examiner—Thuy M. Bui
Attorney, Agent, or Firm—Robert C. Beam

[57] ABSTRACT

An automatic garage door opener mechanism having improved safety and security is disclosed, which comprises:

(a) an electrically-operated motor capable of turning an internal shaft, said shaft having at one end thereof a plurality of annular grooves and ribs cut directly into said shaft and suitable for engagement with a rib-and-groove tractive face belt;

(b) a driven wheel interconnecting with a drive mechanism capable of opening or closing a garage door; and, (c) a rib-and-groove tractive face belt wherein the ribs and grooves are parallel to the length of the belt, said belt being in mating engagement with the plurality of annular grooves and ribs of the internal shaft of said motor, and in tractive engagement with the surface of said driven wheel.

3 Claims, 1 Drawing Sheet

GARAGE DOOR OPENER DRIVE MECHANISM

FIELD OF THE INVENTION

The present invention relates to garage door opener mechanisms. In particular, the present invention relates to an automatic garage door opener mechanism having improved safety, comprising:

(a) an electrically-operated motor capable of turning an internal shaft, said shaft having at one end thereof a plurality of annular grooves and ribs cut directly into said shaft and suitable for engagement with a rib-andgroove tractive face belt;

(b) a driven wheel interconnecting with a drive mechanism capable of opening or closing a garage door; and, (c) a rib-and-groove tractive face belt wherein the ribs and grooves are parallel to the length of the belt, said belt being in mating engagement with the plurality of annular grooves and ribs of the internal shaft of said motor, and in tractive engagement with the surface of said driven wheel.

BACKGROUND OF THE INVENTION

Garage door opener systems typically consist of large motor units containing various circuits and components. With this complexity there is a degree of difficulty in assembly requiring a great deal of time and a skilled assembler. In addition, this complexity is often due to the use of larger, less expensive and more reliable electric motors. Such motors, because of their higher operating speeds, must be stepped down in some manner to a safe operating speed. The mechanisms by which such speed reduction is accomplished is both a disadvantage economically and in mechanic reliability because of the higher incidence of malfunctions as the number of components increases. Further, such mechanisms represent a decrease in security, since such indirect linkages have lower resistance and can be forced more easily than direct linkages.

The speed at which a garage door opener mechanism raises or lowers the garage door is of major concern. A garage door can weight as much as seven hundred pounds, and can easily injure a foot or fingers which are left in the way. Several years ago Underwriters Laboratory required that safety circuits be incorporated which would reverse the movement of garage doors if an obstruction is encountered. Still, such circuits may be absent on older mechanisms, or may cease to function because of use and whether injuries continue to occur, particularly with young children trying to beat the door.

OBJECTS OF THE PRESENT INVENTION

It is an object of the present invention to provide a garage door opener mechanism which operates at a safe speed.

It is a further object of the present invention to provide a garage door opener mechanism which operates at a safe speed employing a reliable, less expensive motor.

It is still a further object of the present invention to provide a garage door opener mechanism which operates at a safe speed without the expense and complexity of step-down mechanisms.

It is a still further object of the present invention to provide a garage door opener mechanism which operates at a safe speed and which also offers the security of a high resistance linkage.

These and other objects, features and advantages of the present invention will become more apparent in light of the following detailed description of the preferred embodiment thereof.

According to the present invention, there is disclosed an automatic garage door opener mechanism having improved safety, comprising:

(a) an electrically-operated motor capable of turning an internal shaft, said shaft having at one end thereof a plurality of annular grooves and ribs cut directly into said shaft and suitable for engagement with a rib-andgroove tractive face belt;

(b) a driven wheel interconnecting with a drive mechanism capable of opening or closing a garage door; and, (c) a rib-and-groove tractive face belt wherein the ribs and grooves are parallel to the length of the belt, said belt being in mating engagement with the plurality of annular grooves and ribs of the internal shaft of said motor, and in tractive engagement with the surface of said driven wheel.

DETAILED DESCRIPTION OF THE DRAWINGS

Figure 1:
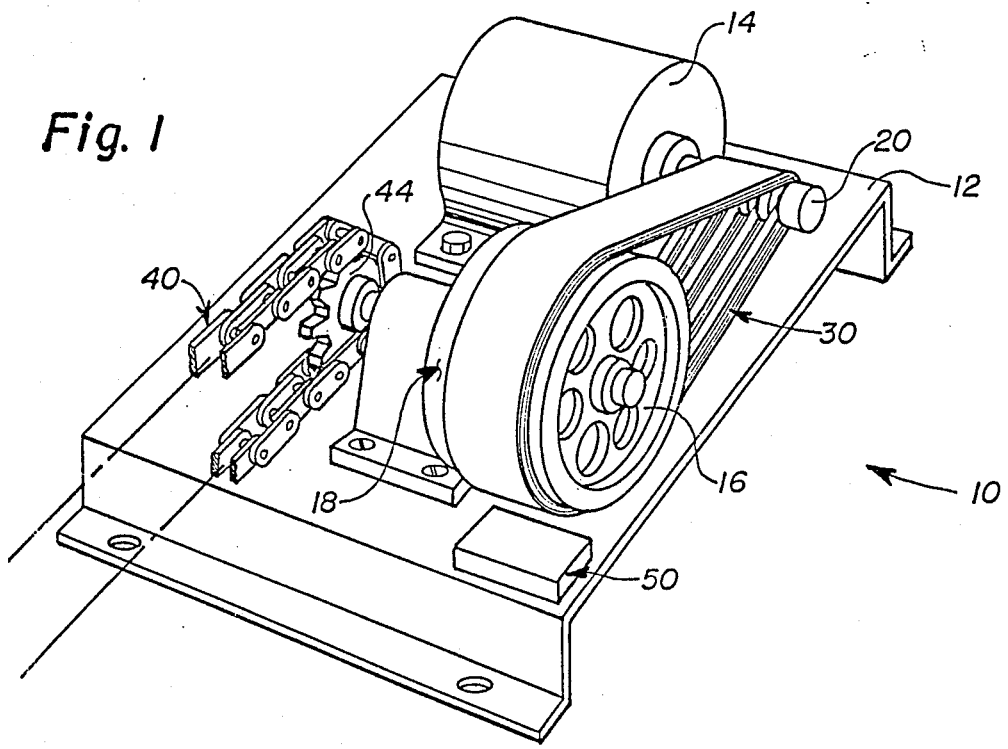
FIG. 1 shows a garage door opener mechanism of the present invention as the mechanism would appear in use.

The present invention comprises a new and improved drive system for garage door openers, in which a "poly-V-groove" belt, available commercially, is driven directly off the shaft of an electric motor. In the preferred embodiment, this belt drives a smooth driven wheel. The motor shaft itself is specially cut with grooves mating with the grooves of the belt, and I am not aware of any other use where a drive belt, even a "poly-V-groove" belt, is driven by the motor shaft itself, without some type of spool or sprocket. With earlier drive belts a spool or sprocket is necessary to provide adequate contact area for the belt and a large enough diameter to accommodate the flexibility of the drive belt.

The small diameter of the drive shaft, as distinguished from a spool or sprocket allows a much greater reduction in the speed of the electric motor permitting a direct drive system with a more reliable, less expensive motor, and without gear or other reductions of the motor speed, which would otherwise be necessary.

A slow speed is desirable in the operation of a garage door for safety reasons. Slow speed is also more suitable for single panel doors with counter weights or for spring loaded single panel doors. Direct drive systems with a great reduction in speed offer more security because they act as an effective locking mechanism and are more difficult to force.

In addition, the mechanism of the present invention tends to be more quiet and smooth running than conventional single V-belt drives. This is partly because, with the smooth surfaced driven wheel employed in the preferred embodiment, misalignments are automatically compensated.

When the drive motor (14) is supplied with electric current it turns the motor shaft (20). A tensioned rib-and-groove tractive face belt (30), known commercially as a "poly-V-groove" belt, engages the motor shaft (20) and also engages driven wheel (16) which is directly connected with a drive mechanism capable of opening or closing a garage door, illustrated by the continuous gear-driven chain (40) driven by sprocket (44) or other means, such as a shaft with a helical groove, commonly employed in the art.

Figure 2:
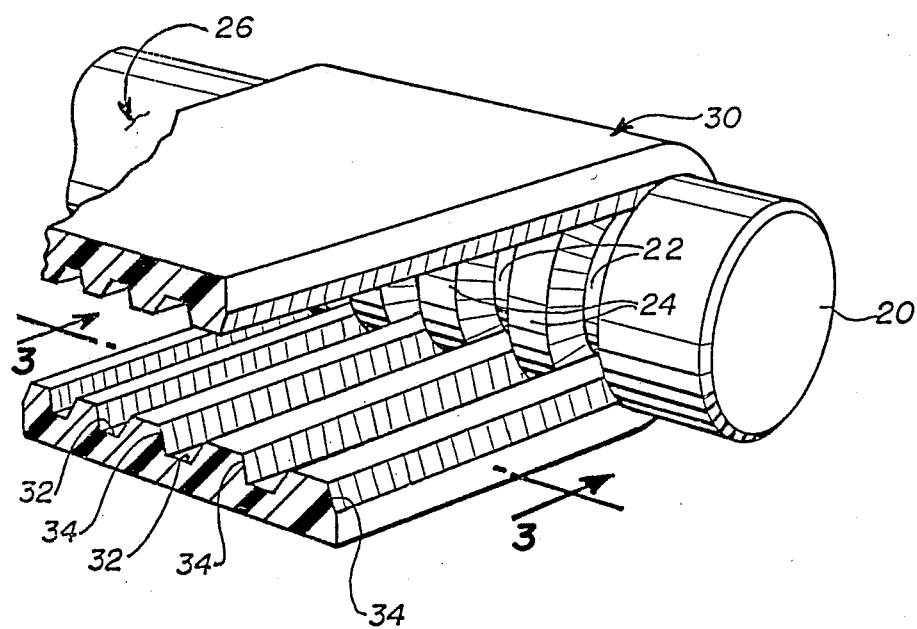
FIG. 2 shows the motor drive shaft and the drive belt.

In FIG. 2, the engagement of the motor shaft (20) and the tractive face belt (30) is shown in greater detail. In the embodiment shown, motor shaft (20) further comprises a plurality of annular grooves (22) and ribs (24) cut directly into the cylindrical face (26) of motor shaft (20).

With continued reference to FIG. 2, there is also shown in detail a portion of an endless tractive face belt (30), also having a plurality of grooves (32) and ribs (34) which are parallel to the length of the belt (30). That is, the ribs (24) of the motor shaft (20) mate with the grooves (32) of the belt (30), while the grooves (22) of the motor shaft (20) mate with ribs (34) of the belt (30). In this manner substantially more surface area of each is engaged and a more positive tractive force may be obtained.

Figure 3:
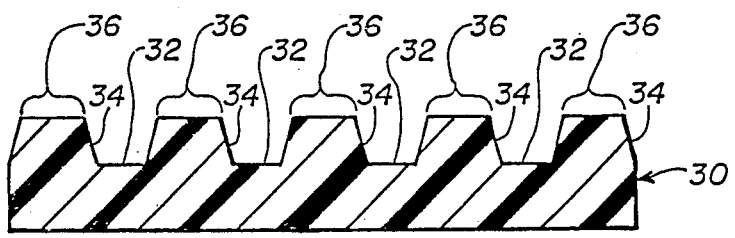
FIG. 3 shows a cross-section of the poly V-groove belt taken at A—A.

The details of this belt are shown more clearly in Fig. 3. With reference to FIG. 1, it may be seen that the tractive face belt (30) also engages a smooth faced driven wheel (16). Because of the smooth surface (18) of the driven wheel (16) the method of engagement of the belt is somewhat different. The grooves (32) of the endless tractive face belt (30) do not contact the smooth surface (18) of the driven wheel (16). The ribs (34) of the tractive face belt (30) engage the smooth surface (18) of the driven wheel (16). However, it is desirable to have the ribs (34) provided with a flattened surface area illustrated as (36) in FIG. 3, in order to provide satisfactory frictional contact.

As seen in the cross-sectional view of the tractive face belt (30) shown in FIG. 3, a flattened surface area (36) is provided on each of the plurality of ribs (34). Tractive face belts are commercially available which are provided with suitable flattened surface areas (36) to provide satisfactory tractive contact for the purposes of the present invention.

As noted previously, the speed at which the opener mechanism opens and closes a garage door is a serious concern. This speed is a function of the drive motor (14) and the form of gearing used to operate the opener mechanism, such as the common gear driven chain (40) illustrated in FIG. 1. It is possible to employ a lower speed motor, but this typically represents a tradeoff in expense, power or reliability and mechanical noise. Gear reduction systems have heretofore been employed, but doing so usually means a more complicated (and thus more expensive and less reliable) apparatus and one with a greater security risk.

One way to slow down the operation of the mechanism without these difficulties, is to increase the drive ratio of the mechanism by decreasing the diameter of the driving wheel or by increasing the diameter of the driven wheel. The diameter of the driven wheel, however, typically determines the size of the overall mechanism, and certain practical limits appear to exist in this regard.

Reducing the diameter of the driving wheel has heretofore been difficult because of the necessary tractive surface and the flexibility of the endless tractive faced belts employed. Some type of larger diameter spool or sprocket has been necessary to provide the necessary tractive surface to drive such belts.

With the commercialization of the more flexible poly-V-groove belt employed in the present invention however, it has been found that the necessary tractive force can be obtained with a much smaller diameter driving wheel. In fact, it has been found that such a belt can be driven with the motor shaft itself, if mating grooves are cut in the shaft. This eliminates the need for a spool or sprocket, the assembly costs of adding such a spool or sprocket, and decreases by one the number of parts which can break, misalign or cause a maintenance problem.

The driving wheel of the present invention is so reduced in size with respect to the prior art, that for a standard door speed a smaller driven wheel can be employed and the overall dimensions of the garage door operator can be reduced.

As an example of the results which may be obtained with the present invention, a typical drive ratio for an opener of the prior art design would be about 7.2:1 resulting in a chain speed of 7.3 inches per second. With an assembly employing the teachings of the present invention, however, a typical drive ratio would be about 11.66:1, resulting in a chain speed of about 4.5 inches per second. Chain speeds as low as 3.25 inches per second have been obtained with a drive ratio of 16.2:1, which has operated satisfactorily. It is believed that even higher drive ratios would still be operative.

The commercially available poly-V-groove belts which may be employed in the present invention include Keilrippenriemen belts from Optibelt, PIRELLI and others.

To operate the apparatus of the present invention, an electric motor should typically be of at least one quarter of a horsepower, and should typically operate at a constant speed of about five hundred to about one thousand revolutions per minute. Such a motor should typically be reversible at about the same speed. Suitable electric motors are available commercially and include permanent split capacitor motors, chiefly for residential use, and continuous use motors for commercial applications.

Although the present invention has been used advantageously for residential and light industrial applications, larger, higher capacity mechanisms could easily be assembled for larger commercial applications. It is believed that greater capacity would only require an increase in scale since it does not appear that the mechanism of the invention has any inherent limitations in this regard.

It will be evident that the terms and expressions that have been employed herein are used as terms of description and not of limitation. There is no intention in the use of such terms and expressions of excluding equivalents of the features shown and described or portions thereof, and it is recognized that various modifications are possible within the scope of the invention claimed.

What is claimed is:

1. An automatic garage door opener mechanism having improved safety, comprising:
    (a) an electrically-operated motor capable of turning an internal shaft, said shaft having at one end thereof a plurality of annular grooves and ribs cut directly into said shaft and suitable for engagement with a rib-and-groove tractive face belt;

(b) a driven wheel interconnecting with a drive mechanism capable of opening or closing a garage door; and, (c) a rib-and-groove tractive face belt wherein the ribs and grooves are parallel to the length of the belt, said belt being in mating engagement with the plurality of annular grooves and ribs of the internal shaft of said motor, in tractive engagement with the surface of said driven wheel.

2. The automatic garage door opener mechanism of claim 1 wherein the driven wheel has a smooth surface.

3. The automatic garage door opener mechanism of claim 1 wherein the internal shaft of the motor and the rib-and-groove tractive face belt each have at least three mating grooves and ribs.

* * * * *